No. 847,719. PATENTED MAR. 19, 1907.
C. H. ARNOLD.
KNUCKLE JOINT.
APPLICATION FILED JAN. 8, 1906.

UNITED STATES PATENT OFFICE.

CHARLES H. ARNOLD, OF NEW LONDON, OHIO.

KNUCKLE-JOINT.

No. 847,719.　　　Specification of Letters Patent.　　　Patented March 19, 1907.

Application filed January 8, 1906. Serial No. 295,127.

*To all whom it may concern:*

Be it known that I, CHARLES H. ARNOLD, a citizen of the United States, and a resident of New London, county of Huron, State of Ohio, have invented certain new and useful Improvements in Knuckle-Joints for Automobiles, of which I hereby declare the following to be a full, clear, and exact description, such as will enable others skilled in the art to which it appertains to make and use the same.

The objects of the invention are to provide a non-rattling joint for metal rods, and it is particularly applicable to the coupling-joints in distance-rods for the motors of automobiles, where the strain is considerable and the pressure soon wears the coupling-pins loose in their bearings.

I am aware that numerous attempts to produce adjustable pivot-pins have been made at different times, and my design is to provide a device of superior efficiency and practicability and ease of adjustment to these and also to provide a "dustproof" joint applicable to the under body of an automobile, where clouds of dust are encountered, which added to the friction would soon wear away a bearing of the ordinary character.

To accomplish these objects, I employ the specific forms of construction and combination and arrangement of parts as hereinafter described, shown in the accompanying drawings, and specifically pointed out in the claims.

Figure 1:
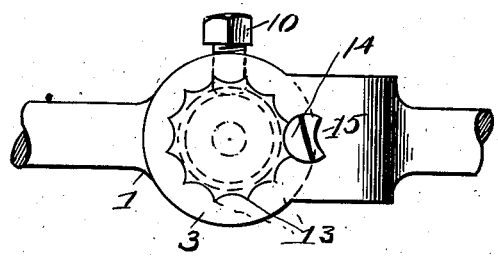
Figure 2:
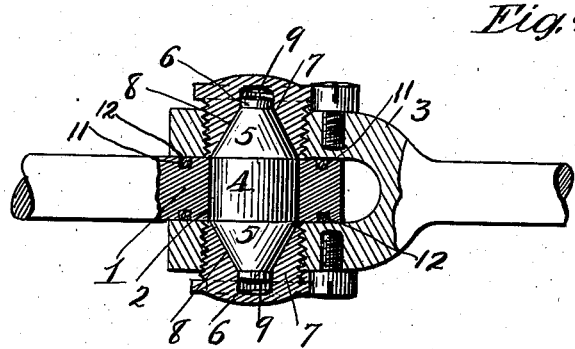

In the accompanying drawings, Figure 1 is a side elevation of the device, and Fig. 2 is a horizontal section therethrough on the center line.

In the views, 1 is the disk-shaped head of a rod provided with a central cylindrical opening 2. 3 is a forked head making a close fit over the flat sides of the head 1. 4 is a pivot-pin having a large cylindrical central portion closely fitting within the opening 2 in the head 1. The extremities of this pivot-pin are reversely tapered at 5 toward their tips 6, which are preferably cylindrical to assist in perfectly centering the caps or enveloping caps 7. These caps are inversely tapered at 8 to receive the tapered extremities of the pivot-pin and are screw-threaded on their outer surfaces for adjustment in the sides of the fork 3 and have corresponding central openings 9, in which the tips of the pivot-pin enter. The caps 7 are inclosed to prevent the entrance of dust into the tapered bearings of the fork, and to prevent the admission of dust between the fork and the sides of the head 1 annular grooves 11 are cut in the disk, and in these grooves are laid rings 12 of some soft elastic substance, such as leather or felt, which will not increase the friction and will serve to retain oil in the bearing, as well as to exclude dust.

The head, with the included rings, is then inserted within the fork and the pin set in place with the tapered extremities equally extending from each side. The capped caps are then screwed into place and perfectly adjusted, and a set-screw 10 is screwed into the head and engages the pivot-pin to prevent it from turning, so that all wear from friction will be received upon the tapered extremities of the pivot-pin.

It is desirable that the adjustment when obtained should be retained until the parts are worn and that when this occurs the caps can be adjusted upon the pin and again locked in position. For this purpose a locking device is shown, which consists in the crenelated projecting edges of the caps 13. The depressions are shown as arcs of a small circle. This edge serves as a convenient means for rotating each cap, and a machine-screw 14 with a cylindrical head is inserted in each arm of the fork closely adjacent to the edge, so as to engage one of the arcs and lock the cap from turning.

One side of each screw-head is mutilated or cut away at 15, so that by turning the head half around the edge of the cap can be rotated without touching the screw.

Having described the invention, what I claim as new, and desire to secure by Letters Patent, is—

1. The combination with a rod having a disk-shaped head and a central cylindrical opening, of a fork engaging the faces of the head, a pivot-pin filling said opening in the head, and having reversely-tapered extremities, caps adjustably secured within the sides of the fork and provided with inversely-tapered recesses corresponding with the tapered extremities of the pivot-pin, said recesses being covered on the outer ends, and said caps having each a crenelated edge and an adjusting-screw in each side of the fork, said screws having a mutilated side, substantially as described.

2. In a joint of the character described, having a disk-shaped head provided with a central cylindrical opening and a fork engaging the same on two sides and provided with screw-threaded openings larger than the opening in the head, the combination therewith, of a pin having a large central portion inserted in said opening and having reversely-tapered extremities, screw-threaded caps in said openings in said fork, said caps provided with tapered openings corresponding with the taper of the pin extremities, each cap having a closed outer end and a crenelated edge and means for preventing the caps from rotating, the said caps being arranged to exclude dust from the bearings of the fork and head, substantially as described.

In testimony whereof I hereunto set my hand this 2d day of December, 1905.

CHARLES H. ARNOLD.

Witnesses:
C. H. OLDS,
WM. M. MONROE.